US007023869B2

(12) United States Patent
Barrow et al.

(10) Patent No.: US 7,023,869 B2
(45) Date of Patent: Apr. 4, 2006

(54) DATA STORAGE SYSTEM WITH ONE OR MORE INTEGRATED SERVER-LIKE BEHAVIORS

(75) Inventors: Jonathan J. Barrow, Franklin, MA (US); Kendell A. Chilton, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 904 days.

(21) Appl. No.: 09/950,165

(22) Filed: Sep. 10, 2001

(65) Prior Publication Data

US 2005/0018709 A1    Jan. 27, 2005

Related U.S. Application Data

(63) Continuation-in-part of application No. 09/852,580, filed on May 10, 2001.

(51) Int. Cl.
*H04L 12/46* (2006.01)
*H04L 12/66* (2006.01)
*G06F 13/00* (2006.01)
*G06F 13/14* (2006.01)
*G06F 15/167* (2006.01)

(52) U.S. Cl. ............... 370/419; 370/463; 710/100; 710/305; 710/316; 709/208; 709/213

(58) Field of Classification Search ............... 710/74, 710/305, 313, 315, 300, 301, 100, 316; 709/220, 709/213, 208, 209, 211, 203; 361/686; 370/389, 370/392, 395.72, 419, 420, 463, 466
See application file for complete search history.

(56) References Cited

U.S. PATENT DOCUMENTS 5,768,623 A * 6/1998 Judd et al. ............... 710/37
5,941,972 A * 8/1999 Hoese et al. ............. 710/315
6,009,466 A * 12/1999 Axberg et al. ........... 709/220
6,175,490 B1 * 1/2001 Papa et al. ............... 361/686
6,230,190 B1 * 5/2001 Edmonds et al. ......... 709/213
6,654,831 B1 * 11/2003 Otterness et al. .......... 710/74
6,748,448 B1 * 6/2004 Barrera et al. ........... 709/245
2001/0023460 A1  9/2001 Boucher, et al. ......... 709/250

FOREIGN PATENT DOCUMENTS

| EP | 0 515 760 A1 | 12/1992 |
| JP | 2000-148566 | 5/2000 |
| JP | 2000-267907 | 9/2000 |

OTHER PUBLICATIONS

Geoffray P; "OPIOM: Off-Processor I/O with Myrinet", Future Generation Computer Systems, v 18, n4, pp. 491-499, Mar. 2002, ISSN 0167-739X.
British Search Report from Application No. GB 0210551.8, filed Nov. 21, 2002, 1 Page.

* cited by examiner

*Primary Examiner*—John Pezzlo
*Assistant Examiner*—Gregory B. Sefcheck
(74) *Attorney, Agent, or Firm*—BainwoodHuang; David E. Huang, Esq.

(57) ABSTRACT

A network adapter is provided that may be used in a network data storage system to facilitate data communication among external data exchanging devices and an input/output (I/O) controller residing in the system. The adapter includes one or more interfaces that may be coupled to an electrical backplane in the system. The backplane is coupled to the controller, and is configured to permit communication between the controller and the adapter when the interfaces are coupled to the backplane. The adapter may provide one or more file server-like behaviors.

36 Claims, 5 Drawing Sheets

DATA STORAGE SYSTEM WITH ONE OR MORE INTEGRATED SERVER-LIKE BEHAVIORS

CROSS-REFERENCE TO RELATED APPLICATION

This application is a continuation-in-part of co-pending U.S. patent application Ser. No. 09/852,580, filed May 10, 2001, entitled "Data Storage System With Improved Network Interface." The entirety of said co-pending U.S. patent application Ser. No. 09/852,580 is hereby incorporated herein by reference.

FIELD OF THE INVENTION

The present invention relates generally to a network adapter (and a method of using same) that may be used in a network data storage system and that facilitates communications between the system and external data exchanging devices (e.g., client computer nodes). More specifically, the present invention relates to such an adapter (and method of using same) wherein one or more integrated server-like capabilities may be used to provide one or more server-like behaviors in the data storage network that comprises the data storage system; these server-like behaviors may facilitate communications between the network data storage system and the data exchanging devices.

BACKGROUND OF THE INVENTION

Network computer systems generally include a plurality of geographically separated or distributed computer nodes that may be configured to communicate with each other via, and are interconnected by, network cabling. One conventional type of network computer system includes a network data storage subsystem that is configured to provide a centralized location in the network at which to store, and from which to retrieve data. Advantageously, by using such a storage subsystem in the network, many of the network's data storage management and control functions may be centralized at the subsystem, instead of being distributed among the network nodes.

One type of conventional network data storage subsystem, manufactured and sold by the Assignee of the subject application (hereinafter "Assignee") under the tradename Symmetrix™ (hereinafter "the Assignee's conventional storage system"), includes a plurality of disk mass storage devices configured as one or more redundant arrays of independent (or inexpensive) disks (RAID). The disk devices are controlled by disk I/O controllers (commonly referred to as "back end" directors) that are coupled to a shared cache memory resource in the subsystem. The cache memory resource is also coupled to a plurality of host I/O controllers (commonly referred to as "front end" directors). The disk controllers are coupled to respective disk adapters that, among other things, interface the disk controllers to bus systems (e.g., small computer system interface (SCSI) based bus systems) used to couple the disk devices to the disk controllers. Similarly, the host controllers are coupled to respective host channel/network adapters that, among other things, interface the host controllers via channel input/output (I/O) ports to the network communications channels that couple the storage subsystem to standalone computer nodes (commonly termed "host" computer nodes or "hosts") in the computer network external to the subsystem. The hosts may communicate with the subsystem via the channels using I/O protocols such as Fibre Connectivity (FICON), SCSI, Enterprise Systems Connection (ESCON), or Fibre Channel (FC) based protocols. In these communications between the hosts and the subsystem, the hosts may request that blocks of data be stored in, or retrieved from, the subsystem, by specifying (among other things) particular data block locations in the disk devices in the subsystem to which the data is to be stored, or from which the data is to be retrieved. Hereinafter, this type of communication (i.e., communication for the purpose of storing or retrieving one or more blocks of data) is termed "block-oriented" communication, and the communication protocols used to carry out such communication are termed "block-oriented" protocols, respectively.

In one conventional heterogeneous data storage network arrangement, the host computer nodes may comprise server computer nodes (commonly termed "server nodes" or "servers"). The servers may be coupled to client computer nodes (commonly termed "client nodes" or "clients") via a communication network that may utilize a client/server-oriented I/O protocol (e.g., Transmission Control Protocol/Internet Protocol (TCP/IP), Ethernet protocol, or Gigabit Ethernet (Gig-E) protocol). In communications with the servers via the communication network, the clients may request that data be stored or retrieved from the servers and/or data storage subsystem by specifying in the requests particular filenames or handles (e.g., UNIX or network file system (NFS) filenames) associated with the data to be stored or retrieved. Hereinafter, this type of communication (i.e., communication for the purpose of storing or retrieving data wherein a filename associated with the data is specified) is termed "file-oriented" communication, and the communication protocols used to carry out such protocols are termed "file-oriented" protocols, respectively. Thus, in this conventional heterogeneous network arrangement, data exchange/communication among the servers and clients may be carried out via this communication network, using file-oriented communications; however, data exchange/communication among the servers and the data storage system may be carried out via the network communication channels, using the block-oriented communications.

The servers may be configured to provide certain services (hereinafter referred to as "server behaviors") that may facilitate data exchange/communication among the data storage system and the clients. For example, in one type of server behavior, a server may translate into corresponding block-oriented I/O requests file-oriented I/O requests received from a client, and may forward the block-oriented I/O requests to the data storage system. The server may also translate the block-oriented responses received from the data storage system to these block-oriented I/O requests into corresponding file-oriented responses, and may forward these file-oriented responses to the client. Thus, in this type of service, the server may act as a client I/O request translation resource in the data storage network.

In other types of server behavior, the server may provide application-level program process resources. For example, the server may operate as a database engine that accesses databases stored in the data storage system. In response to file-oriented database commands (e.g., database queries), the server may provide to the data storage system block-oriented commands, and after executing the block-oriented commands, the system may provide the server with the results of system's execution of the block-oriented commands. The server may then forward these results to the client using a file-oriented communication protocol.

Thus, in this conventional network arrangement, the server nodes are standalone computer nodes or systems that are external to both the data storage system and the client nodes, and may be coupled to the network via network cabling. Such standalone server nodes may be relatively expensive and complex devices that may require substantial amounts of time and effort to install, configure, manage, and maintain in the data storage network. Also, the presence of such standalone servers in-between the data storage system and the clients introduces into the data storage network another stage, or hop, that the data must propagate through when the data moves from the clients to the data storage system, and vice versa; this may increase latency in moving data from the client nodes to the data storage system, and vice versa. Furthermore, it can be difficult to coordinate, control, and manage the independent operations of the standalone server nodes. Additionally, the cabling that may be used to couple the standalone server nodes to the network may add undesired complexity to the network, and may be a potential source of unreliable network behavior (via, e.g., injection of ambient electrical noise into the communication signals propagating through the cabling, and/or failure to properly configure the network connections made using the cabling). Moreover, the standalone server nodes may consume an undesirably large amount of geographic "floor space," which may undesirably increase the total cost of the network.

SUMMARY OF THE INVENTION

In accordance with the present invention, a network adapter and method of using same are provided that overcome the aforesaid and other disadvantages and drawbacks of the prior art. In one embodiment of the present invention, a network adapter is provided that is used in a network data storage system and may facilitate data communication among one or more external data exchanging devices and an I/O controller residing in the system. The data storage system may comprise a set of mass storage devices (e.g., disk mass storage devices) that may exchange data with the data exchanging devices via the adapter. The adapter may include one or more interfaces that may be physically coupled to a signal transmission medium/system (e.g., an electrical backplane) in the system. The backplane may be coupled to the controller, and may be configured to permit data communication between the controller and the adapter when the interfaces are coupled to the backplane. The adapter may also be configured so as to be able to provide one or more server behaviors to the data exchanging devices.

The adapter may be embodied as an electrical circuit card that may be configured to be inserted into and received by a circuit card slot in the backplane in the data storage system. When the circuit card is inserted into and received by the slot, the card may be electrically and mechanically coupled to the backplane in the data storage system such that the one or more interfaces of the card are electrically coupled to the backplane.

The adapter may be assigned a first network layer address based at least partially upon a slot identification number that identifies the location of the backplane circuit card slot in which the adapter card is inserted and resides. The first network layer address may be changed during a configuration of the data storage system to a second network layer address.

The one or more interfaces of the adapter may comprise at least one interface through which a command may be issued to the adapter to cause the adapter to change from a first (operational) mode to a second (diagnostic) mode of operation. For example, the one or more interfaces of the adapter may comprise a first interface and a second interface. The first interface may permit a processor that is external to the adapter card, the controller, and the data exchanging devices to issue a management or diagnostic testing-related command to the adapter card via the backplane. Optionally, the external processor also may be external to the data storage system itself, may be coupled to the adapter via a network, and may access the adapter card via the network, using the second network layer address. The second interface may permit the controller to issue a management or diagnostic command to the adapter card via the backplane. The one or more interfaces of the adapter may also comprise a third interface that may permit configuration-related information (e.g., information related to the configuration of the adapter) to be retrieved via the backplane from a non-volatile memory (e.g., comprising one or more electrically erasable/programmable read only memory (EEPROM) devices) comprised in the adapter card.

In summary, a network adapter according to the present invention is configured to be able to provide one or more server behaviors. The adapter may be configured for insertion into a network data storage system, and when inserted into the network data storage system, one or more interfaces comprised in the adapter may be coupled to a signal transmission medium in the data storage system. When the one or more interfaces are so coupled to the signal transmission medium, an I/O controller in the data storage system may be able to exchange data with the adapter via the medium, and server behaviors provided by the adapter may be used, e.g., to facilitate data communication among at least certain external data exchanging devices (e.g., client computer nodes) and the controller in the data storage system. In various embodiments of the present invention, the adapter's one or more interfaces may be used to receive commands that may cause adapter to initiate diagnostic testing, provide adapter configuration-related information, and/or execute other types of functions/operations. In various embodiments of the present invention, these commands may be also issued by one or more processors that may be external to or comprised within the data storage system, and/or by the controller.

As a result of the server behaviors that may be provided by the network adapter of the present invention, in contrast to the aforedescribed conventional data storage network configuration, a data storage network that is appropriately configured with one or more of the network adapters of the present invention may not require standalone network file server nodes intermediate to the data storage system and clients. Advantageously, this may permit the amount of geographic "floor space" consumed by a data storage network wherein the present invention is practiced to be reduced, may permit the cost and complexity of such a data storage network to be reduced, and may reduce the amount of time and effort required to configure, manage, and maintain such a data storage network. Further advantageously, in embodiments of the present invention, the processing required to initiate and execute diagnostic testing of network file server functionality provided in the data storage network may be carried out within the data storage system, thereby permitting the control and management of such processing to be centralized within the data storage system. Yet further advantageously, in a data storage network that is appropriately configured with one or more of the network adapters of the present invention, the cabling that would be required, according to the prior art, to couple standalone network file servers to the network may be eliminated entirely, thereby eliminating the complexity associated with such cabling and a potential source of unreliable network behavior.

Additionally, the absence from the data storage network of such standalone server nodes avoids placing in the data storage network the additional network hop or stage associated with such standalone server nodes between the client nodes and the data storage system. Advantageously, with fewer network hops, there can be less latency in moving data between the client nodes and the data storage system, and vice versa. Further advantageously, by integrating server functions into the network adapters of the present invention, there may be less processing overhead dedicated to managing and executing server-like operations in a data storage network wherein the present invention is practiced, compared to the prior art.

These and other features and advantages of the present invention will become apparent as the following Detailed Description proceeds and upon reference to the Figures of the Drawings, in which like numerals depict like parts, and wherein:

Although the following Detailed Description will proceed with reference being made to illustrative embodiments and methods of use of the present invention, it should be understood that it is not intended that the present invention be limited to these illustrative embodiments and methods of use. On contrary, many alternatives, modifications, and equivalents of these illustrative embodiments and methods of use will be apparent to those skilled in the art. Accordingly, the present invention should be viewed broadly as encompassing all such alternatives, modifications, and equivalents as will be apparent to those skilled in art, and should be viewed as being defined only as forth in the hereinafter appended claims.

DETAILED DESCRIPTION OF ILLUSTRATIVE EMBODIMENTS

Figure 1:
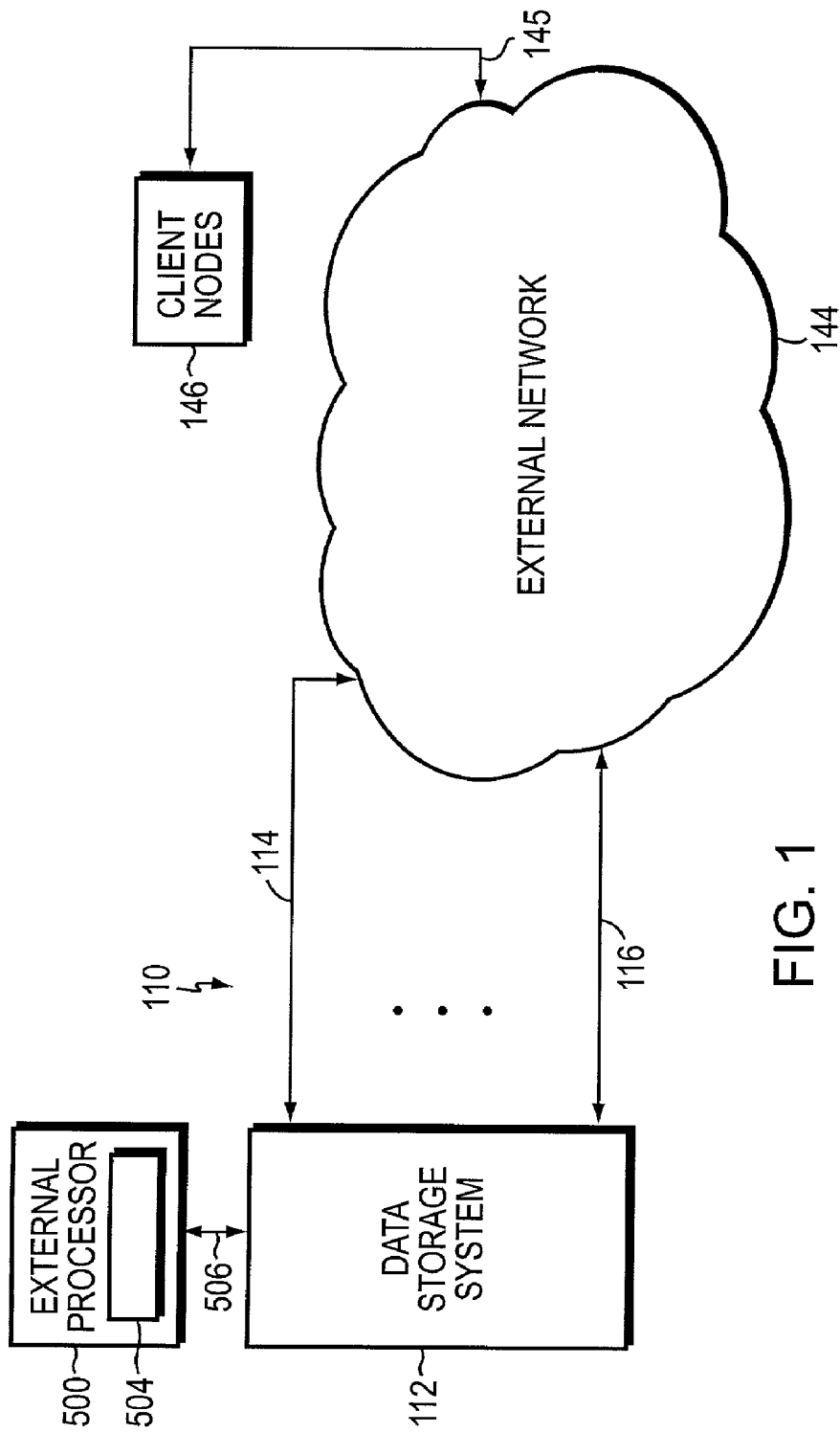
FIG. 1 is a high level functional schematic block diagram of a data storage network that includes a network data storage system having network adapters made according to one embodiment of the present invention.

Turning now to FIGS. 1–5, illustrative embodiments of the present invention will be described. FIG. 1 is a high level block diagram illustrating a data storage network 110 that includes a network data storage system 112 that is coupled via respective communication links (collectively referred to by numerals 114 . . . 116) to an external network 144. Network 144 may be a heterogeneous network environment comprising multiple local and/or wide area networks and wherein multiple different network I/O protocols may be used (e.g., file-oriented protocols, such as Ethernet and Gig-E protocols, as well as, block-oriented FC protocol). Network 144 is also coupled to client computer nodes (collectively or singly referred to by numeral 146 in FIG. 1) via network communication links (collectively or singly referred to by numeral 145 in FIG. 1). The communication protocols utilized by the links 114 . . . 116 and 145 are selected so as to ensure that the nodes 146 may exchange data and commands with the data storage system 112 via network 144.

In general, each of the computer nodes 146 may comprise a respective computer-readable memory (not shown) for storing software programs and data structures associated with, and for carrying out the functions and operations described herein as being carried by these nodes 146. In addition, each of the nodes 146 may further include one or more respective processors (not shown) and network communication devices for executing these software programs, manipulating these data structures, and for permitting and facilitating exchange of data and commands among the client nodes 146 and the data storage system 112 via the communication links 114 . . . 116, network 144, and links 145.

Figure 2:
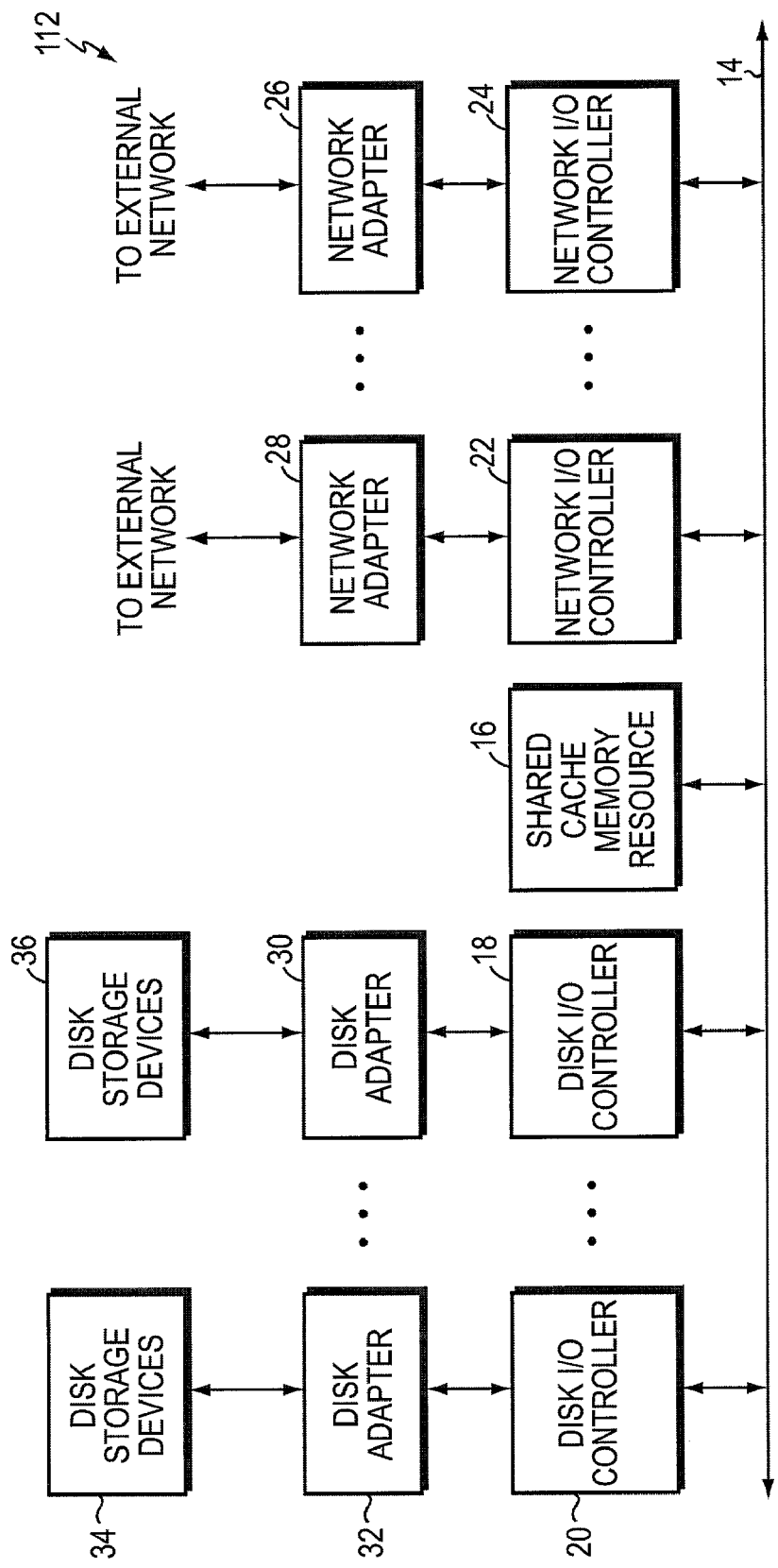
FIG. 2 is a high level schematic diagram illustrating functional components of the network data storage system included in the data storage network shown in FIG. 1.

FIG. 2 is a high level schematic block diagram of functional components of the system 112. System 112 may include a bus system 14 that electrically couples together a plurality of network I/O controllers 22 . . . 24, a plurality of disk I/O controllers 18 . . . 20, and a shared cache memory resource 16. Bus system 14 may include a plurality of redundant buses (not shown) and bus arbitration, termination, and control systems (also not shown).

Figure 3:
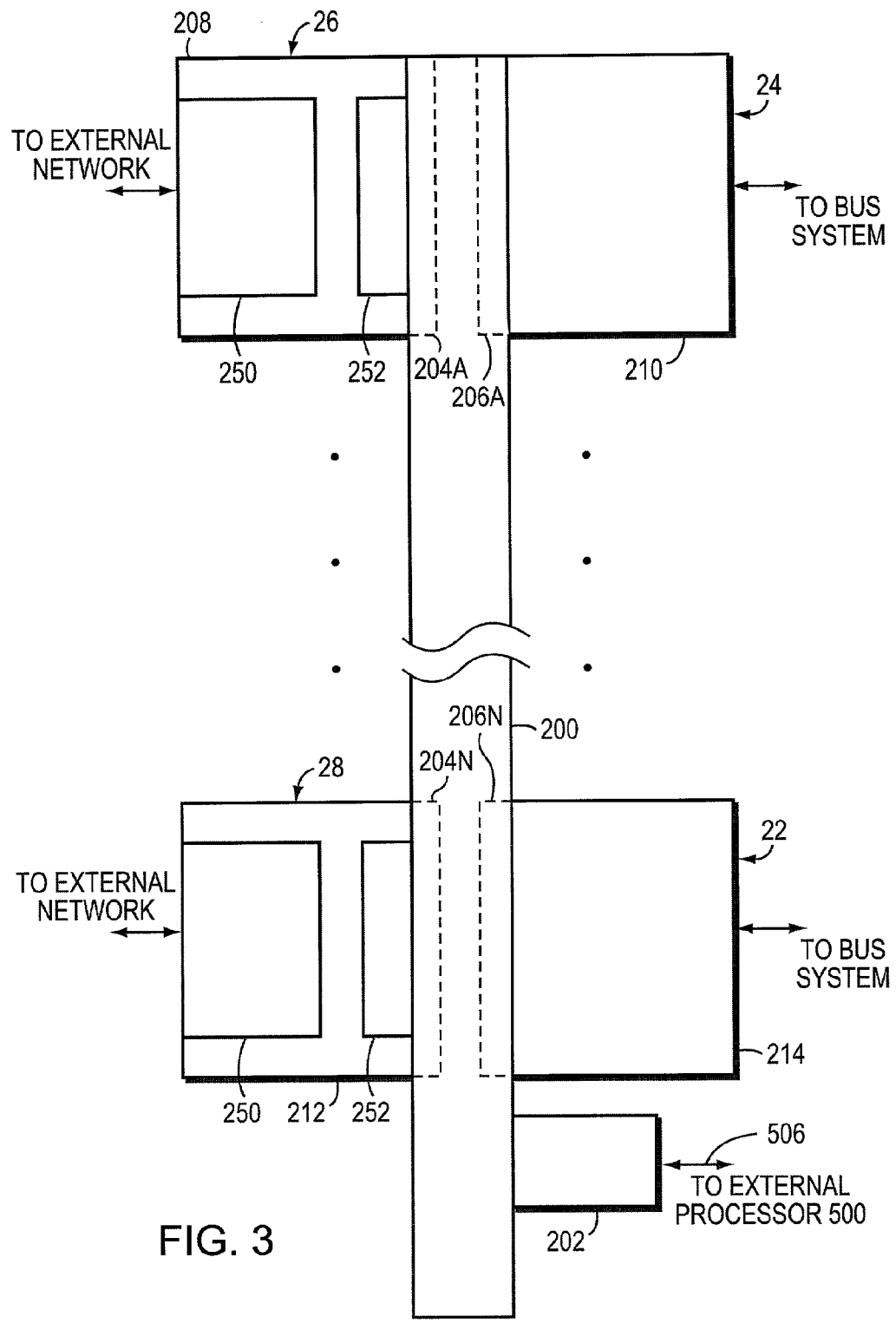
FIG. 3 is high level schematic block diagram illustrating the manner in which the network adapters made according to one embodiment of the present invention may be coupled to an electrical backplane in the network data storage system illustrated in FIG. 2.
Figure 4:
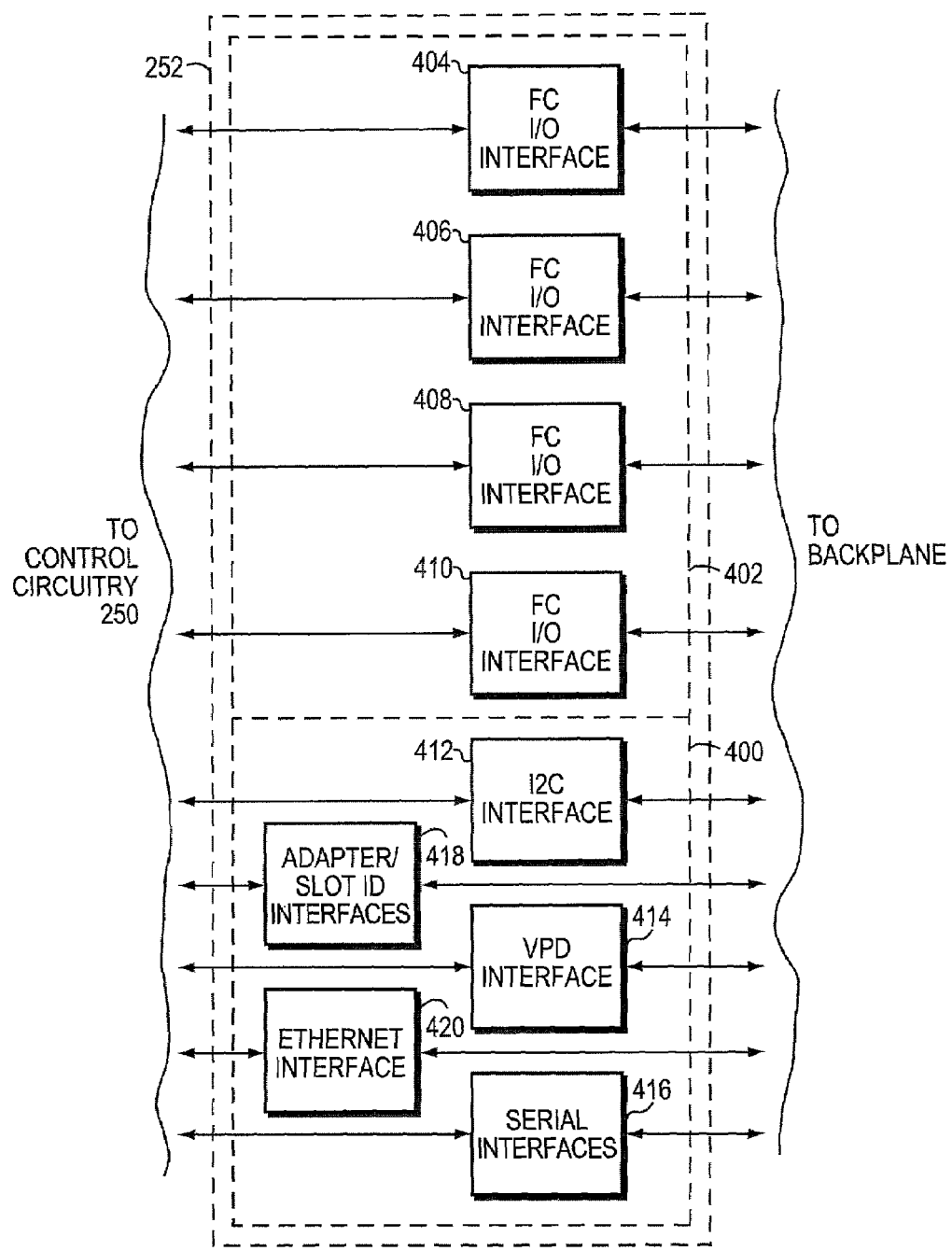
FIG. 4 is high level schematic block diagram illustrating backplane interfaces that may be comprised in a network adapter made according to one embodiment of the present invention.

Each network I/O controller 22 . . . 24 may comprise a single respective electrical circuit card or panel. For example, as is shown in FIG. 3, the controllers 22, 24 may each comprise a single respective electrical circuit card or panel 214, 210. Likewise, each disk controller 18 . . . 20 may comprise a single respective electrical circuit card or panel. Each disk adapter 30 . . . 32 may comprise a single respective electrical circuit card or panel. Likewise, each network adapter 26 . . . 28 may comprise a single respective electrical circuit card or panel. For example, as is shown in FIG. 3, the network adapters 26, 28 may each comprise a single respective electrical circuit card or panel 208, 212. Each network I/O controller may be electrically and mechanically coupled to a respective network adapter via a respective mating electromechanical coupling system, which system is described more fully below.

In this embodiment of system 112, each of the network adapters 26 . . . 28 may be coupled to network 144 via respective communication links 114 . . . 116. For example, adapter 26 may be coupled to network 144 via communication links 114, and adapter 28 may be coupled to the network 144 via communication links 116. It should be appreciated that the respective numbers and types of communication links comprised in the links 114 . . . 116 may vary, depending upon the particular configurations of the adapters 26 . . . 28, and network I/O controllers 22 . . . 24, network 114, and client nodes 146, without departing from this embodiment of the present invention.

Disk adapter 32 is electrically coupled to a set of mass storage devices 34, and interfaces the disk controller 20 to those devices 34 so as to permit exchange of data and commands between processors (not shown) in the disk controller 20 and the storage devices 34. Disk adapter 30 is electrically coupled to a set of mass storage devices 36, and interfaces the disk controller 18 to those devices 36 so as to permit exchange of data and commands between processors (not shown) in the disk controller 18 and the storage devices 36. The devices 34, 36 may be configured as redundant arrays of conventional disk mass storage devices. It should be understood, however, that if system 112 is appropriately modified in ways apparent to those skilled in the art, mass storage devices 34, 36 may comprise optical, solid state, or other types of memory devices without departing from the present invention.

It should be appreciated that the respective numbers of the respective functional components of system 112 shown in FIG. 2 are merely for illustrative purposes, and depending upon the particular application to which the system 112 is intended to be put, may vary without departing from the present invention. For example, it may be desirable to permit the system 112 to be capable of failover fault tolerance in the event of failure of a particular component in the system 112. Thus, in practical implementation of the system 112, it may be desirable for system 112 to include redundant functional components and mechanisms for ensuring that the failure of any given functional component is detected and the operations of any failed functional component are assumed by a respective redundant functional component of the same type as the failed component.

With particular reference being made to FIGS. 2–5, the construction and operation of illustrative embodiments of the present invention will now be described. System 112 includes a plurality of electrical backplanes, including backplane 200. Backplane 200 includes a first plurality of backplane connection slots 204A . . . 204N, and a second plurality of backplane connection slots 206A . . . 206N. Each of the network I/O adapter cards is configured and dimensioned to permit the network I/O adapter cards to be inserted into and received by respective of the first plurality of backplane connection slots 204A . . . 204N, such that, when the network I/O adapter cards are so inserted into and received by the slots 204A . . . 204N, the network I/O adapter cards become electrically and mechanically coupled to the backplane 200 via the slots 204A . . . 204N. For example, network I/O adapter cards 208, 212 are configured and dimensioned to permit cards 208, 212 to be inserted into and received by slots 204A, 204N, respectively, such that, when the cards 208, 212 are so inserted into and received by the slots 204A, 204N, the cards 208, 212 become electrically and mechanically coupled to the backplane 200 via the slots 204A, 204N.

Likewise, each of the network I/O controller cards is configured and dimensioned to permit the network I/O controller cards to be inserted into and received by respective of the second plurality of backplane connection slots 206A . . . 206N, such that, when the network I/O controller cards are so inserted into and received by the slots 206A . . . 206N, the network I/O controller cards become electrically and mechanically coupled to the backplane 200 via the slots 206A . . . 206N. For example, network I/O controller cards 210, 214 are configured and dimensioned to permit the network I/O controller cards 210, 214 to be inserted into and received by slots 206A, 206N, respectively, such that, when the network I/O controller cards 210, 214 are so inserted into and received by the slots 206A, 206N, respectively, the cards 210, 214 become electrically and mechanically coupled to the backplane 200 via the slots 206A, 206N.

Backplane 200 includes a plurality of internal electrical connections (not shown). These internal connections are configured such that, when the network I/O controller and network I/O adapter cards are properly inserted into and received by appropriate respective backplane connection slots, each network I/O controller becomes electrically coupled to the respective network I/O adapter with which it is associated, and the network I/O controllers and network I/O adapters are electrically coupled to external processor interface 202 (whose purpose is described below). For example, when controller cards 210, 214 are so inserted into and received by slots 206A, 206N, respectively, and adapter cards 208, 212 are so inserted into and received by slots 204A, 204N, respectively, controller 24 becomes electrically coupled via the backplane's internal electrical connections to its associated adapter 26, controller 22 becomes electrically coupled via these connections to its associated adapter 28, and the connections also electrically couple the controllers 22, 24 and adapters 26, 28 to interface 202.

It should be understood that, unless specifically stated to the contrary herein, each of the network I/O adapters 26 . . . 28 in the system 112 may have an identical respective construction and operation. When the electrical circuit card 208 that comprises adapter 26 is properly inserted into and received by the slot 204A, one or more backplane interfaces 252 of the adapter card 208 become electrically and mechanically coupled to the backplane 200. The interfaces 252 comprise a plurality of adapter control and management interfaces 400 and a plurality of FC I/O interfaces 402 (see FIG. 4). The control interfaces 400 may comprise a conventional Inter-IC (I2C) protocol control bus interfaces 412, a vital product data (VPD) interface 414, serial management/diagnostics interfaces 416, network I/O adapter card identification/backplane slot identification interfaces 418, and an Ethernet network interface 420. In this illustrative embodiment of the present invention, the FC I/O interfaces 402 may comprise four FC I/O interfaces 404, 406, 408, 410; however, the number of the FC I/O interfaces comprised in the I/O interfaces 402 may vary, so as to coincide with the number of I/O ports in the controller 24, without departing from the present invention.

When the interfaces 252 become coupled to the backplane 200, the I/O interfaces 402 become coupled via the backplane's internal electrical connections to the controller 24 with which the adapter 26 is associated, the interfaces 412, 416, and 418 become electrically coupled via the connections to the controller 24, and the interface 420 becomes electrically coupled via the connections to the interface 202. In addition thereto, the interfaces 414 and 418 may become electrically coupled via the connections in the backplane 200 to the interface 202.

Figure 5:
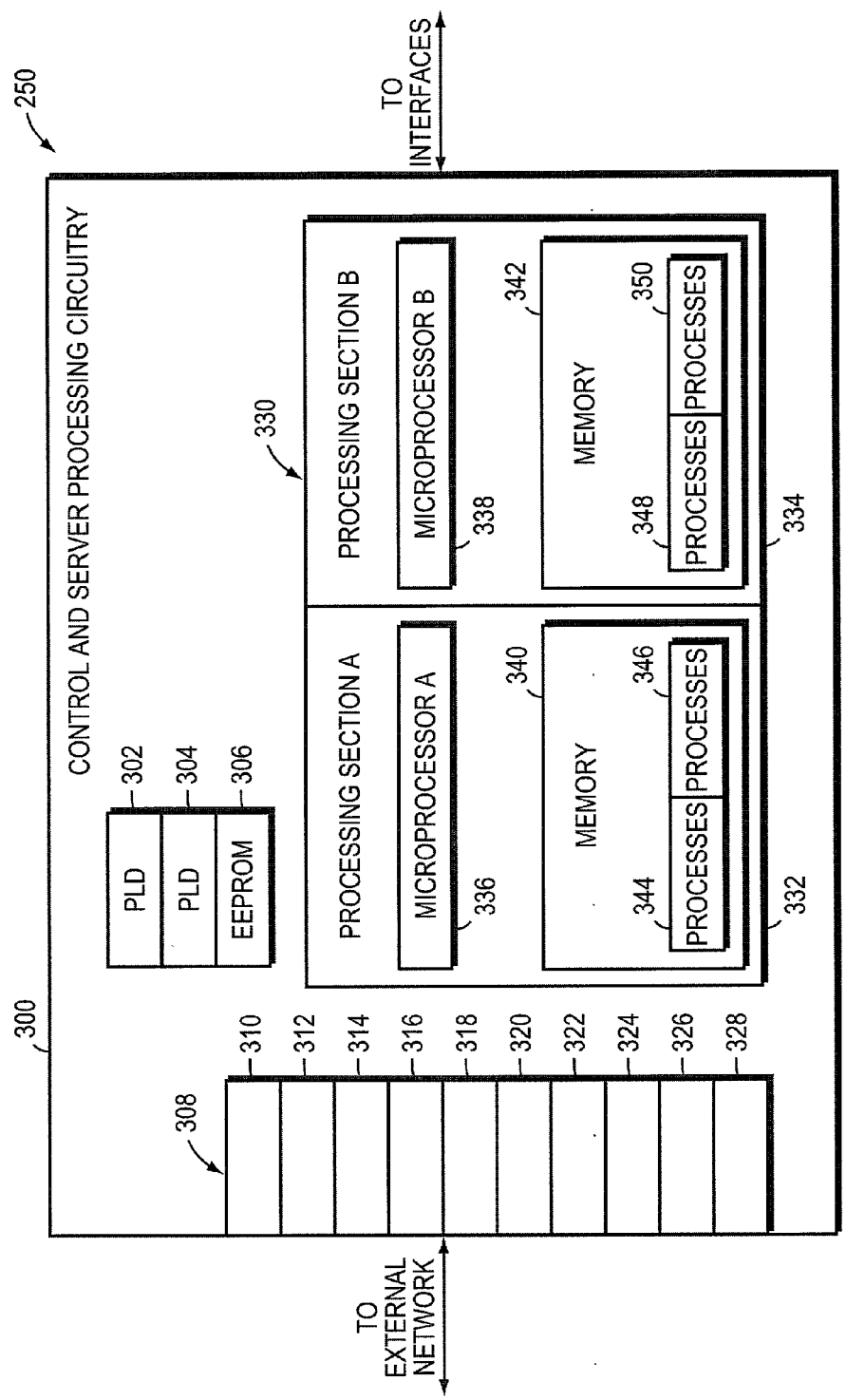
FIG. 5 is a high level schematic block diagram illustrating functional components of control and server processing circuitry comprised in a network adapter made according to one embodiment of the present invention.

In adapter 26, the interfaces 252 are electrically coupled to control circuitry 250. As is shown in FIG. 5, circuitry 250 includes control and server processing circuitry 300 that comprises a plurality of external I/O ports/interfaces and associated communication-related circuitry (collectively referred to by numeral 308), central processing circuitry 330, programmable logic device (PLD) 302, PLD 304, and electrically erasable programmable read only memory (EEPROM) 306.

The external I/O ports/interfaces and related circuitry 308 comprise a plurality of separate external ports/interfaces 310, 312, 314, 316, 318, 320, 322, 324, 326, and 328. Each of the interfaces 310, 312, 314, 316, 318, 320, 322, and 324 may comprise respective network communication circuitry (not shown) that permits the adapter 26 to exchange data and commands with the network 144 via a respective communication link comprised in the links 114 using the network communication protocol that is used by that respective communication link. For example, if the links 114 comprise four Gig-E communication links, then the interfaces 310, 312, 314, and 316 may be configured so as to permit the adapter 26 to be able to exchange data and commands with the network 144 via these four Gig-E communication links comprised in links 114, using the interfaces 310, 312, 314, and 316, respectively. Additionally, if the links 114 additionally comprise two FC arbitrated loops (AL), then the interfaces 318 and 320 may be configured so as to permit the adapter 26 to be able to exchange data and commands with the network 144 via these two FC AL loops comprised in the links 114, using the interfaces 318 and 320, respectively. Also, if the links comprise two Ethernet communication links (e.g., 100BaseT Ethernet links), then the interfaces 322 and 324 may be configured so as to permit the adapter 26 to be able to exchange data and commands with the network 144 via these two Ethernet communication links comprised in the links 114, using the interfaces 322 and 324, respectively. Interfaces 326 and 328 may comprise respective conventional RS232 interfaces; alternatively, without departing from this embodiment of the present invention, the adapter 26 may only comprise a single RS232 interface. It should be appreciated, however, that without departing from this embodiment of the present invention, the numbers and types of interfaces comprised in the interfaces 308 may vary, so long as, among other things, said numbers and types are selected such that the adapter 26 may communicate with the clients 146 via the links 114, network 144, and the links 145.

Processing circuitry 330 may comprise a multi-processor system that includes two separate central processing unit sections or "slices" 332 and 334. Section 332 may comprise a microprocessor (and related circuitry) 336, and computer-readable random access and read-only memory (and related circuitry) 340. Section 334 may comprise a microprocessor (and related circuitry) 338, and computer-readable random access and read-only memory (and related circuitry) 342. Microprocessors 336 and 338 may each comprise a respective Pentium III™ (or superior) microprocessor of the type manufactured and commercially available from Intel Corporation of Santa Clara, Calif., United States of America. Alternatively, microprocessors 336, 338 may each comprise a respective PowerPC™ microprocessor of the type manufactured and commercially available from Motorola, Inc. of Austin, Tex., United States of America.

Memories 340 and 342 each store software programs and data structures associated with, and for carrying out the inventive and other functions, methods, techniques, and operations described herein as being carried out by the adapter 26. The microprocessors 336 and 338 and other circuitry comprised in circuitry 250 may be configured to execute these software programs and manipulate these data structures so as to cause and facilitate the inventive and other functions, methods, techniques, and operations described herein as being carried out by the adapter 26. For example, according to this embodiment of the present invention, a plurality of computer program processes and associated data structures 344, 346, 348, and 350 may be resident in memories 340 and 342. As will be described more fully below, the execution and manipulation of these processes and associated data structures 344, 346, 348, 350 by the processors 336 and 338 and other circuitry in the processing sections 332 and 334 may cause the adapter 26 to be able to provide one or more server behaviors to the clients 146. It should be understood that, although circuitry 330 may be thought of as comprising two separate logical memories 340 and 342, if the processors 336 and 338 are appropriately programmed to utilize conventional techniques to prevent the occurrence of memory clashes, the processors 336 and 338 may share memory resources in the adapter 26.

Section 332 may be associated with, and may exchange data and commands with the network 144 via interfaces 310, 312, 318, and 322. Section 334 may be associated with, and may exchange data and commands via interfaces 314, 316, 320, and 324. PLD 302 and PLD 304 are coupled to interfaces 416. EEPROM 306 is coupled to interface 414. Section 332 may be associated with, and may exchange data and commands with the controller 24 via FC interfaces 404 and 406 (see FIG. 4). Section 334 may be associated with, and may exchange data and commands with the controller 24, via FC interfaces 408 and 410. The RS232 interfaces 326 and 328 may be used as, e.g., Universal Asynchronous Receiver/Transmitter (UART) circuits for permitting communication with sections 332 and 334, respectively, and/or other components in circuitry 250.

After the system 112 and adapter 26 have executed initial power-up or reset boot procedures, the adapter 26 may initially enter a default mode of operation. In this default mode of operation, the adapter 26 may operate in accordance with predetermined default configuration parameters. These parameters may specify, e.g., among other things, an initial network layer address offset (e.g., 10.1.1.0) to be used in determining a specific respective network layer address (e.g., an IP address) to be assigned to the adapter 26, an initial mode of operation for the adapter 26 (e.g., a normal, i.e., non-diagnostic and non-testing) mode of operation in which data and commands may be exchanged between the adapter 26 and the client nodes 146 via the links 114 and 145, and network 144, and also wherein data and commands may be exchanged between the adapter 26 and the controller 24 via, e.g., the interfaces 402. These default parameters may be preprogrammed into the circuitry 300.

In the normal mode of operation, the controller 24 may monitor and control operation of the circuitry 300 by exchanging data and commands with the circuitry 300 via conventional I2C serial bus interface 412, using conventional I2C protocol. These commands may be transmitted through the interfaces 412 to the circuitry 300 via a conventional I2C bus (not shown).

System 110 also includes a computer processor 500 that is external to the host nodes 124 . . . 126, adapters 26 . . . 28, and controllers 22 . . . 24. Processor 500 may be coupled to the backplane 200 via a conventional hub system (e.g., that may comprise a plurality of conventional Ethernet hubs) that may be comprised in interface 202, and communication link 506. The not shown electrical connections in the backplane 200 may include conventional 10BaseT connections that may couple, among other things, the adapters 26 . . . 28 and controllers 22 . . . 24 to the hub system in the interface 202 such that the processor 500 may exchange data and commands with the adapters 26 . . . 28 and controllers 22 . . . 24 using conventional Ethernet protocol communication techniques. The Ethernet interface 420 comprised in adapter 26 may be used to couple the circuitry 300 in adapter 26 to the processor 500 via one of the 10BaseT connections in the backplane 200.

A human user may review and modify the aforesaid and/or other default configuration parameters via a configuration/management utility program 504 that may be executed by and resident in computer processor 500. More specifically, when executed by the processor 500, program 504 may provide a graphical user interface that may permit the human user to be able to exchange data and commands with the circuitry 300 via the interface 420 and that may allow the human user to monitor and control the operation and internal states of the circuitry 300 and components thereof. By appropriately controlling the operation and internal states of the circuitry 300 and components thereof, the human user may change some or all of the aforesaid and other default configuration parameters, and may otherwise control the configuration and operation of the circuitry 300. The configuration parameters that have been changed by the user via the program 504 may be stored in the circuitry 300 or another storage location in system 112 that is accessible by the circuitry 300, and may persist despite subsequent rebooting and/or resetting of the system 112 and/or adapter 26, unless and until they are again changed by the user.

Additionally, while the adapter 26 is in the normal operating mode, the controller 24 may issue a command to the circuitry 300 via the interface 414 that, when received by the circuitry 300 may cause the circuitry 300 to retrieve from the non-volatile EEPROM 306 information related to the configuration of the adapter 26. Such configuration-related information may comprise or specify, e.g., among other things, a part number assigned to the card 208 by the manufacturer of the card 208, a serial number assigned to the card 208, a revision level of the hardware/software embodied in the card 208, text comments associated with the card 208 (e.g., written by a human technician that may describe previous problems encountered by, or repairs made to the card 208), etc. This information may be written to the EEPROM 306 during manufacturing, repair, and/or troubleshooting of the card 208 so as to make easier future processing, diagnostics, repair, and troubleshooting of the card 208. The information retrieved from the EEPROM 306 may be forwarded by the circuitry 300 to the controller 24 via the interface 414. The command issued via the interface 414 by the controller 24 may be initiated in response to receipt by the controller 24 of a request issued by the processor 500 for selected information contained in the EEPROM 306. After receiving the information retrieved from the EEPROM 306, the controller 24 may supply the information to the processor 500 for use and/or display by the program 504.

The program 504 may also allow the human user to issue to the circuitry 300 via the interface 420 in adapter 26 a command for initiating diagnostic testing of the adapter 26. This command, when received by the circuitry 300, may cause the adapter 26 to change from the initial, normal operational mode that the adapter 26 enters after an initial power-up or resetting of the adapter 26 or system 112, to a diagnostic testing mode of operation. In this diagnostic mode of operation, the adapter 26 may execute one or more diagnostic routines or procedures. These procedures may include one or more conventional built-in self-tests (BIST) of the adapter 26 itself, control circuitry 300, processing circuitry 330, processing sections 332 and 334, ports 308, interfaces 252, and/or components thereof, and/or other types of diagnostic procedures (e.g., that may be similar in concept to those disclosed in commonly-assigned, co-pending U.S. patent application Ser. No. 09/877,810 filed Jun. 7, 2001, entitled "Data Storage System With Integrated Switching," the entirety of which co-pending application is hereby incorporated herein by reference). The types and/or nature of the one or more BIST and/or other diagnostic routines executed by the adapter 26 may be selected by the human user using the program 504. The user may use the program 504 to monitor the execution of the one or more BIST and/or other diagnostic tests by the adapter, and after the adapter 26 has completed execution of the one or more BIST and/or other diagnostic tests selected by the user, the circuitry 308 may report the results of the one or more BIST and/or other diagnostic tests to the program 504 via the interface 420, and the program 504 may cause these results to be displayed in a form that is understandable by the user. In addition, the adapter 26 may be programmed to execute one or more power-on self-test diagnostic routines or procedures at power-up of the adapter 26.

Serial interfaces 416 may comprise two serial interfaces that may be respectively coupled to the PLD 302 and PLD 304. The controller 24 may cause the adapter 26 to change from the normal mode of operation to the diagnostic testing mode of operation by issuing an appropriate diagnostic command to either or both of the PLD 302 and PLD 304 via the appropriate serial interface or serial interfaces comprised in the interfaces 416. Depending upon the diagnostic command issued to the PLD 302 and PLD 304 by the controller 24, the adapter 26 may be caused to execute one or more BIST of the adapter 26 itself, control circuitry 300, processing circuitry 330, processing sections 332 and 334, ports 308, interfaces 252, and/or components thereof. After completing the execution of the one or more BIST diagnostic routines or procedures, the adapter 26 may report the results of the diagnostic routines or procedures performed (e.g., whether the adapter 26 whose operation is being tested by the diagnostic routines or procedures is functioning within normal operating tolerances); the adapter may then change from the diagnostic mode to the normal operating mode. Thereafter, the adapter 26 may continue to operate in the normal operating mode.

The processor 500 may command the controller 24 to command the adapter 26 to change from the normal mode of operation to the diagnostic mode of operation and may specify the type of diagnostic testing that the controller 24 is to command the adapter 26 to execute (e.g., one or more BIST and/or other diagnostic routines of the type disclosed in aforesaid commonly-assigned, co-pending U.S. patent application Ser. No. 09/877,810 filed Jun. 7, 2001, entitled "Data Storage System With Integrated Switching"). The processor 500 may be comprised in system 112, or alternatively, as is shown in FIG. 2, the processor 500 may be external to the system 112. If the processor 500 is external to the system 112, the processor 500 may exchange data and commands with these components using TCP/IP protocol. For example, in this alternative arrangement, the link 506 may comprise a conventional TCP/IP network link between the interface 202 and the processor 500, and the interface 420 in adapter 26 may be configured to permit the adapter 26 to be able to receive and transmit TCP/IP command and data packets with the processor 500 via the link 506, interface 202, and internal electrical connections in the backplane 200.

In this alternative arrangement, the adapter 26 may be assigned an IP address to be used in communicating with the external processor 500. This IP address may be determined by adding to the network layer address offset (as initially predetermined in the default parameters, or as modified by the user via processor 500) the value specified by a backplane connection slot identification number (or predetermined number of bits thereof) assigned to the backplane slot 204A in which the adapter card 208 is inserted. That is, each of the connection slots 204A . . . 204N may be hardwired to generate a respective slot identification number that indicates the location/position of the slot relative to the other such slots in the backplane 200, and when a respective one of the adapter cards (e.g., adapter card 208) is properly inserted into a respective one of the backplane slots (e.g., slot 204A), the respective slot identification number associated with that backplane slot 204A may be communicated to the circuitry 300 in the respective adapter card 208 via the slot identification interface comprised in the card's interfaces 418. This identification number may then be used to generate the IP address that the adapter 26 may use to communicate with the external processor 500. The default IP address offset in the default parameters may be changed, using the program 504, to second and/or subsequent offset values, as desired by the user of program 504. This may have the result of changing the initial network layer address assigned to the adapter 26 based upon the initial network layer address offset and the slot location identification number to another network layer address.

Although not shown in the Figures, it should be understood that processor 500 may include a computer-readable memory that stores software programs and data structures associated with, and for carrying out the inventive and other functions, methods, techniques, and operations described herein as being carried out by the processor 500. Additionally, the external processor 500 may include a computer processor, computer user interface, and networking and other circuitry that are configured to execute these software programs and manipulate these data structures. The execution of the software programs by the computer processor, computer user interface, and the networking and other circuitry in processor 500 may cause and facilitate the inventive and other functions, methods, techniques, and operations described herein as being carried out by the external processor 500. It will be apparent to those skilled in the art that many types of computer processors, computer user interface and networking circuitry, and computer-readable memories may be used according to the teachings of the present invention to implement processor 500.

Further alternatively, although not shown in the Figures, if appropriately modified in ways apparent to those skilled in the art, the data storage network 110 may comprise two processors of the type of processor 500. In this further alternative arrangement, one of these two processors may be comprised in the system 112, but may be external to the adapters 26 . . . 28 and controllers 22 . . . 24, and the other of these two processors may be external to the system 112, and may communicate with the system 112 via a TCP/IP network link.

In accordance with this embodiment of the present invention, the processes 344 and 348 may comprise computer operating system (OS) processes such as those generated by Data Access in Real Time (DART), UNIX, or Linux OS. Processes 346 and 350 may comprise processes that may utilize services (e.g., system calls, library functions, etc.) provided by the OS processes 344 and 348 and may provide to the one or more client nodes 146 one or more server behaviors. Program processes 346 and 350 may be configured, e.g., to translate file-oriented communications into corresponding block-oriented communications, and vice versa; in addition thereto, the processes 346 and 350 may comprise one or more application-level program processes (e.g., that may provide to, or facilitate use of database query and related functions by the client nodes 146).

For example, according to this embodiment of the present invention, a client node 146 (hereinafter termed "the requesting client node") may forward via one of the links 145, network 144, and one of the links 114, a file-oriented database query/search command (e.g., requesting that the system 112 forward to the node 146 the data in one or more data files satisfying query/search criteria specified in the command), or alternatively, a file-access command (e.g., requesting that the system 112 forward to the node 146 data in one or more data files specified in the command) to one (e.g., Gig-E port 310) of the external ports 308. The processes 346 executed by the microprocessor 340 may include one or more database engine processes, and the processes 346 also may maintain a set of tables (not shown, hereinafter referred to as "mapping tables") in memory 340. The mapping tables may include mapping information that may map logical data files (e.g., UNIX files), that may be requested by the client nodes 146, to corresponding actual data block locations in the disk storage devices 34 . . . 36 of system 112, e.g., in a manner that may be similar to that used by a conventional external network file server running NFS to map such logical data files to actual data block locations. If the command forwarded to the adapter 26 is a query command, these database engine processes may utilize conventional database query/search techniques to determine one or more data files that satisfy the query command criteria. The processes 346 may use the information in the mapping tables to determine one or more data blocks (hereinafter referred to as "the identified data blocks") in one or more of the disk storage devices 34 . . . 36 that contain the data files satisfying the query criteria (if the command is a query command) or as specified in the command (if the command is a file access command).

The processes 346 may then cause the processing section 332 to transmit to the controller 24, via the FC interfaces 404 and 406 (see FIG. 4), a request that the controller 24 forward to the adapter 26 the data contained in the identified data blocks. In response to receipt of this request by the controller 24, the controller 24 may then ascertain from data storage management tables (not shown) stored in the cache 16 whether the data contained in the identified data blocks is currently in the cache 16; if it currently is not in the cache 16, the controller 24 may request that the disk controller (e.g., controller 18) associated with the storage devices 36 within which the data contained in the identified data blocks is stored, retrieve that data into the cache 16. In response to the request from the controller 24, the disk controller 18 may forward via the disk adapter 30 to which it is coupled appropriate commands for causing one or more of the disk devices 36 to retrieve the data contained in the identified data blocks. In response to such commands, the devices 36 may forward the data contained in the identified data blocks to the disk controller 18 via the disk adapter 30. The disk controller 18 may then store the data in the cache 16.

When the data contained in the identified data blocks is in the cache 16, the controller 24 may retrieve that data from the cache 16 and forward it to the processing section 332 in adapter 26 via the FC interfaces 404 and 406. The processes 346 may initially buffer that data in the memory 340, and may convert the data from a format suitable for FC data transmission into a format suitable for Gig-E data transmission. The processes 346 may then cause the port 310 in adapter 26 to forward to the requesting client node 146 (e.g., as the results of the command from the requesting client node 146), in a format suitable for Gig-E data transmission, the reformatted data buffered in the memory 340, via one of the links 114, the network 114, and one of the links 145.

Additionally, a client node 146 (hereinafter termed "the storing client node") may forward via one of the links 145, the network 144, and one of the links 114, a request to the adapter 26 to store file-oriented data (e.g., data comprising a data file) in the system 112. The data file storage request forwarded to the adapter 26 may be initially received by one of the ports 308 (e.g., Gig-E port 310) in the adapter 26. In response to receipt by the port 310 of the data file storage request, the processes 346 may use the mapping tables to determine one or more data blocks in the devices 34 . . . 36 that correspond to the data file whose data is to be stored in the system 112 and/or wherein that data is to be stored (hereinafter termed "the storage blocks"). The processes 346 may also initially buffer the file's data in the memory 340, and may convert that data into a format suitable for transmission to the controller 24 in the FC protocol. The processes 346 may then cause the section 332 to generate and forward to the controller 24, via the FC interfaces 404 and 406, a request to store the reformatted data in the storage blocks.

In response to the data storage request forwarded to it, the controller 24 may initially store the data in cache 16. Thereafter, one of the disk controllers (e.g., controller 18) may cause this data stored in the cache 16 to be stored in the storage blocks by issuing appropriate commands for same to the devices 36 via the adapter 30.

In this embodiment of the present invention, one of the network I/O adapters (e.g., adapter 28, hereinafter termed "the controlling adapter") may be configured to monitor, manage, and control the operations of the other network I/O adapters (hereinafter termed "the controlled adapters") in system 112. In order to facilitate this, each of the network I/O adapters 26 . . . 28 may be coupled together via Ethernet communication links that enable the control and processing circuitry 250 in each of the network I/O adapters 26 . . . 28 to exchange data and commands among each other. The circuitry 250 in the controlling adapter 28 may be configured to control the operation of the controlled adapters by issuing appropriate commands (e.g., simple network management protocol (SNMP) based commands) to the controlled adapters via these Ethernet communication links. The circuitry 250 in each of the controlled adapters may be configured to execute the commands issued to them via the Ethernet communication links, and may also be configured to forward to the circuitry 250 in the controlling adapter 28 respective messages (e.g., SNMP-based messages) indicating the status of the controlled adapters' respective operations. In the event that the controlling adapter 28 determines, as a result of its monitoring activities, that one of the controlled adapters has failed, the controlling adapter 28 may cause fail-over and/or fault recovery processes to be initiated in the system 112, whereby to permit the processing that otherwise would be carried out by the failed controlled adapter instead to be carried out by a controlled adapter that is operating normally.

The terms and expressions which have been employed in this application are used as terms of description and not of limitation, and there is no intention, in the use of such terms and expressions, of excluding any equivalents of the features shown and described or portions thereof, but it is recognized that various modifications are possible within the scope of the invention as claimed. For example, although the cache 16, disk controllers 18 . . . 20, and network I/O controllers 22 . . . 24 have been described as being coupled via bus system 14, if system 112 is appropriately modified, the cache 16, disk controllers 18 . . . 20, and network I/O controllers 22 . . . 24 may be coupled together and communicate via a matrix of point-to-point data transfer and messaging systems, e.g., of the type disclosed in co-pending U.S. patent application Ser. No. 09/745,814 entitled, "Data Storage System Having Crossbar Switch With Multi-Staged Routing," filed Dec. 21, 2000; this co-pending application is owned by the Assignee of the subject application, and is hereby incorporated by reference herein in its entirety.

Other modifications are also possible. For example, the circuitry 300 in adapter 26 may be configured to supply to the controller 24 via the adapter identification interface comprised in the interfaces 418 a value that identifies the type and configuration of the adapter 26. This value may be used by the controller 24 to evaluate whether the controller 24 and adapter 26 are configured to operate properly together; if the controller 24 determines that controller 24 and adapter 26 are not so configured, the controller 24 may signal an error condition.

Other modifications are also possible. Accordingly, the present invention should be viewed broadly as encompassing all modifications, variations, alternatives and equivalents as may be encompassed by the hereinafter appended claims.

What is claimed is:

1. A network adapter that may be used in a network data storage system that permits data communication among data exchanging devices and a data storage system input/output (I/O) controller, the controller residing in the data storage system, the data exchanging devices being external to the adapter, the adapter comprising:

one or more interfaces that may be coupled to an electrical backplane of the system, the backplane being coupled to the controller and being configured to permit communication between the controller and the adapter when the one or more interfaces are coupled to the backplane; and the adapter being configured such that the adapter may provide at least one server behavior, wherein the at least one server behavior includes at least one of the following:

making available to one or more of the data exchanging devices an application-level program resource;

providing, in response to a block-oriented communication received by the adapter from the controller, a file-oriented communication to one or more of the data exchanging devices; and providing, in response to a file-oriented communication received by the adapter from the one or more of the data exchanging devices, a block-oriented communication to the controller.

2. The network adapter of claim 1, wherein the adapter may communicate with the controller via the backplane using a first communication protocol, and the adapter may communicate with at least one of the data exchanging devices using a second communication protocol, the second communication protocol being different from the first communication protocol.

3. The network adapter of claim 2, wherein the first communication protocol is a fibre channel (FC) communication protocol, and the second communication protocol is a Gigabit Ethernet (Gig-E) communication protocol.

4. The network adapter of claim 1, wherein the data storage system comprises a set of mass storage devices that may exchange data with the data exchanging devices via the adapter.

5. The network adapter of claim 1, wherein the adapter is assigned a network layer address based at least partially upon a slot identification number that identifies a location in the data storage system in which the adapter resides.

6. The network adapter of claim 1, wherein the adapter is an electrical circuit card that is configured to be electrically and mechanically coupled to the backplane.

7. The network adapter of claim 1, wherein the one or more interfaces comprise a first interface, a second interface, and a third interface, the first interface permitting a processor that is external to both the adapter and the controller to issue a command to the adapter, the second interface permitting the controller to issue a diagnostic command to the adapter, and the third interface permitting configuration-related information to be retrieved from a non-volatile memory comprised in the adapter.

8. The network adapter of claim 1, wherein the adapter is configured such that operation of the adapter may be monitored and controlled by another network adapter coupled to the backplane.

9. The network adapter of claim 1, wherein, when the one or more interfaces are coupled to the backplane, the network adapter also may be coupled to both at least one processor and at least one other adapter, the at least one other adapter also being coupled to the backplane, the at least one processor being external to the controller and the adapters.

10. The network adapter of claim 9, wherein:
the at least one processor is also coupled to the controller; and
the at least one processor, the at least one other adapter, and the second communication network are comprised in the data storage system.

11. The network adapter of claim 9, wherein:
the at least one processor comprises a first processor and a second processor; wherein the first processor also is coupled to the controller; and wherein (i) the first processor and the at least one other adapter are comprised in the data storage system, and (ii) the second processor is external to the data storage system.

12. The network adapter of claim 1, wherein the adapter includes memory, and at least one program process may execute in the memory whereby to provide the at least one server behavior.

13. A network adapter that may be used in a network data storage system that permits data communication among data exchanging devices and a data storage system input/outnut (I/O) controller, the controller residing in the data storage system, the data exchanging devices being external to the adapter, the adapter comprising:
one or more interfaces that may be coupled to an electrical backplane of the system, the backplane being coupled to the controller and being configured to permit communication between the controller and the adapter when the one or more interfaces are coupled to the backplane; and
the adapter being configured such that the adapter may provide at least one server behavior, wherein:
the adapter comprises a first processing section and a second processing section;
when the one or more interfaces are coupled to the backplane, the first processing section may communicate with the controller via a first subset of the interfaces, and the second processing section may communicate with the controller via a second subset of the interfaces; and
each of the processing sections comprises a respective microprocessor.

14. A circuit card configured to be inserted into and received by a circuit card slot in a network data storage system, the card comprising:
one or more interfaces that may be coupled via a signal transmission system of the data storage system to an input/output (I/O) controller of the data storage system when the card is inserted into the slot, the one or more interfaces permitting communication between the controller and the card when the one or more interfaces are coupled to the controller; and
the card being configured such that the adapter may provide at least one server behavior, wherein:
the card includes a first processing section and a second processing section;
the card includes a first set of ports and a second set of ports, the sets of ports each comprise respective types and a respective number of ports, and the respective types and number of ports comprised in the first set of ports corresponds to the respective types and number of ports comprised in the second set of ports;
the one or more interfaces include a first set of interfaces and a second set of interfaces, the sets of interfaces each comprise respective types of interfaces and a respective number of interfaces, the respective types and the respective number of interfaces comprised in the first set of interfaces corresponds to the respective types and the respective number of interfaces comprised in the second set of interfaces; and
when the card is inserted in the slot:
the first processing section may communicate with the controller via the first set of interfaces,
the second processing section may communicate with the controller via the second set of interfaces, and
the first processing section and the second processing section may communicate with the data exchanging devices via the first set of ports and the second set of ports, respectively.

15. The card of claim of claim 14, wherein each of the sets of ports comprises a respective first port and a respective second port, the respective first port is for use in fibre channel (FC) protocol communication, and the respective second port is for us in Gigabit Ethernet (Gig-E) protocol communication.

16. The card of claim of claim 15, wherein each of the sets of interfaces comprises a respective plurality of interfaces for use in FC protocol communication.

17. The card of claim 16, wherein each of the processing sections comprises a respective microprocessor.

18. A circuit card configured to be inserted into and received by a circuit card slot in a network data storage system, the card comprising:
one or more interfaces that may be coupled via a signal transmission system of the data storage system to an input/output (I/O) controller of the data storage system when the card is inserted into the slot, the one or more interfaces permitting communication between the controller and the card when the one or more interfaces are coupled to the controller; and
the card being configured such that the adapter may provide at least one server behavior, wherein the at least one server behavior includes at least one of the following:
making available to one or more of the data exchanging devices an application-level program resource;
providing, in response to a block-oriented communication received by the adapter from the controller, a file-oriented communication to one or more of the data exchanging devices; and
providing, in response to a file-oriented communication received by the adapter from the one or more of the data exchanging devices, a block-oriented communication to the controller.

19. A method of using a network adapter in a network data storage system that permits data communication among data exchanging devices and a data storage system input/output (I/O) controller, the controller residing in the data storage system, the data exchanging devices being external to the adapter, the adapter including one or more interfaces and being configurable such that the adapter may provide at least one server behavior, the method comprising:
coupling the one or more interfaces to an electrical backplane of the system, the backplane being coupled to the controller and being configured to permit communication between the controller and the adapter when the one or more interfaces are coupled to the backplane;

configuring the adapter such that the adapter may provide the at least one server behaviors, wherein the at least one server behavior includes at least one of the following:

making available to one or more of the data exchanging devices an application-level program resource;

providing, in response to a block-oriented communication received by the adapter from the controller, a file-oriented communication to one or more of the data exchanging devices; and providing, in response to a file-oriented communication received by the adapter from the one or more of the data exchanging devices, a block-oriented communication to the controller.

20. The method of claim 19, wherein the adapter may communicate with the controller via the backplane using a first communication protocol, the adapter may communicate with at least one of the data exchanging devices using a second communication protocol, and the second communication protocol is different from the first communication protocol.

21. The method of claim 20, wherein the second communication protocol is a Gigabit Ethernet (Gig-E) communication protocol.

22. The method of claim 19, wherein the data storage system comprises a set of mass storage devices, and the method further comprises exchanging data with the data exchanging devices via the adapter.

23. The method of claim 19, further comprising, assigning a network layer address based at least partially upon a slot identification number that identifies a location in the data storage system in which the adapter resides.

24. The method of claim 19, wherein the adapter is an electrical circuit card that is configured to be electrically and mechanically coupled to the backplane.

25. The method of claim 19, wherein the one or more interfaces comprise a first interface, a second interface, and a third interface, the first interface permitting a processor that is external to both the adapter and the controller to issue a command to the adapter, the second interface permitting the controller to issue a diagnostic command to the adapter, and the third interface permitting configuration-related information to be retrieved from a non-volatile memory comprised in the adapter.

26. The method of claim 19, wherein operation of the adapter is monitored and controlled by another network adapter coupled to the backplane.

27. The method of claim 19, further comprising, coupling the network adapter to both at least one processor and at least one other adapter, and coupling the at least one other adapter to the backplane, the at least one processor being external to the controller and the adapters.

28. The method of claim 27, wherein:

the method further comprises coupling the at least one processor to the controller; and the at least one processor and the at least one other adapter are comprised in the data storage system.

29. The method of claim 27, wherein:

the at least one processor comprises a first processor and a second processor; wherein the method further comprises coupling the first processor via a second communication network to the controller; and wherein (i) the first processor and the at least one other adapter are comprised in the data storage systems, and (ii) the second processor is external to the data storage system.

30. The method of claim 19, wherein the adapter includes memory, and the at least one server behavior is provided by at least one program process that executes in the memory.

31. A method of using a network adapter in a network data storage system that permits data communication among data exchanging devices and a data storage system input/output (I/O) controller, the controller residing in the data storage system, the data exchanging devices being external to the adapter, the adapter including one or more interfaces and being configurable such that the adapter may provide at least one server behavior, the method comprising:

coupling the one or more interfaces to an electrical backplane of the system, the backplane being coupled to the controller and being configured to permit communication between the controller and the adapter when the one or more interfaces are coupled to the backplane;

configuring the adapter such that the adapter may provide the at least one server behavior, wherein:

the adapter comprises a first processing section and a second processing section;

the first processing section communicates with the controller via a first subset of the interfaces, and the second processing section communicates with the controller via a second subset of the interfaces; and each of the processing sections comprises a respective microprocessor.

32. A method of using a circuit card that is configured to be inserted into and received by a circuit card slot in a network data storage system, the card including one or more interfaces and being configurable such that the card may provide at least one server behavior, the method comprising:

inserting the card into the slot, the inserting of the card into the slot coupling the one or more interfaces of the card to a signal transmission system in the data storage system that permits communication between the controller and the card;

configuring the card such that the card may provide the at least one server behavior, wherein:

the card includes a first processing section and a second processing section;

the card includes a first set of ports and a second set of ports, the sets of ports each comprise respective types and a respective number of ports, and the respective types and number of ports comprised in the first set of ports corresponds to the respective types and number of ports comprised in the second set of ports;

the one or more interfaces include a first set of interfaces and a second set of interfaces, the sets of interfaces each comprise respective types of interfaces and a respective number of interfaces, the respective types and the respective number of interfaces comprised in the first set of interfaces corresponds to the respective types;

the first processing section may communicate with the controller via the first set of interfaces;

the second processing section may communicate with the controller via the second set of interfaces, and the first processing section and the second processing section may communicate with the data exchanging devices via the first set of ports and the second set of ports, respectively.

33. The method of claim of claim 32, wherein each of the sets of ports comprises a respective first port and a respective second port, the respective first port is used in fibre channel (FC) protocol communication, and the respective second port is used in Gigabit Ethernet (Gig-E) protocol communication.

34. The method of claim of claim 33, wherein each of the sets of interfaces comprises a respective plurality of interfaces used in FC protocol communication.

35. The method of claim 34, wherein each of the processing sections comprises a respective microprocessor.

36. A method of using a circuit card that is configured to be inserted into and received by a circuit card slot in a network data storage system, the card including one or more interfaces and being configurable such that the card may provide at least one server behavior, the method comprising:

inserting the card into the slot, the inserting of the card into the slot coupling the one or more interfaces of the card to a signal transmission system in the data storage system that permits communication between the controller and the card;

configuring the card such that the card may provide the at least one server behavior, wherein the at least one server behavior includes at least one of the following:

making available to one or more of the data exchanging devices an application-level program resource;

providing, in response to a block-oriented communication received by the adapter from the controller, a file-oriented communication to one or more of the data exchanging devices; and providing, in response to a file-oriented communication received by the adapter from the one or more of the data exchanging devices, a block-oriented communication to the controller.

\* \* \* \* \*

UNITED STATES PATENT AND TRADEMARK OFFICE
CERTIFICATE OF CORRECTION

PATENT NO. : 7,023,869 B2
DATED : April 4, 2006
INVENTOR(S) : Jonathan J. Barrow and Kendell A. Chilton It is certified that error appears in the above-identified patent and that said Letters Patent is hereby corrected as shown below:

Column 19,
Line 5, "behaviors" should read -- behavior --.

Signed and Sealed this

Thirtieth Day of May, 2006

JON W. DUDAS
*Director of the United States Patent and Trademark Office*